Figure 1:
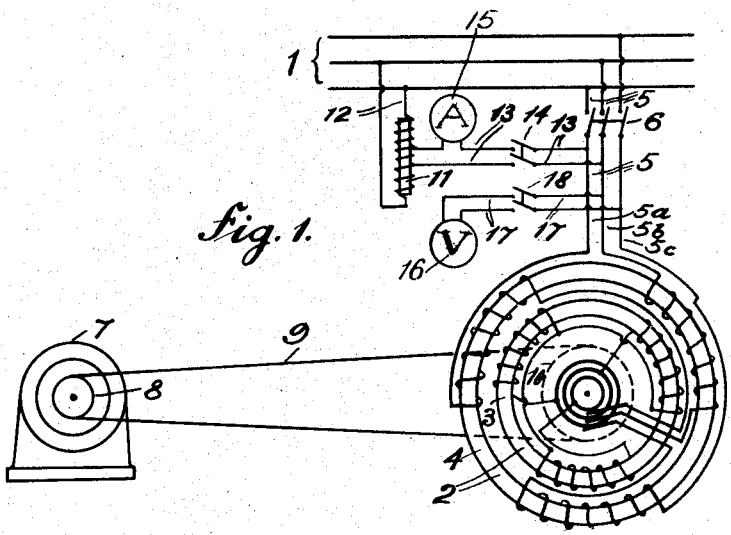

C. A. LOHR.
METHOD OF SYNCHRONIZING.
APPLICATION FILED MAY 27, 1907.

1,204,169.

Patented Nov. 7, 1916.

WITNESSES:
G. S. Mattha.
Ray Morris

INVENTOR
Carl A. Lohr

UNITED STATES PATENT OFFICE.

CARL A. LOHR, OF NEW YORK, N. Y.

METHOD OF SYNCHRONIZING.

1,204,169.  Specification of Letters Patent.  Patented Nov. 7, 1916.

Application filed May 27, 1907. Serial No. 376,021.

*To all whom it may concern:*

Be it known that I, CARL A. LOHR, a subject of the Emperor of Germany, and a resident of New York, in the county and State of New York, have invented certain new and useful Improvements in Methods of Synchronizing, of which the following is a specification.

My present invention relates to means for synchronizing synchronous electric motors (or generators) and more specially a class of synchronous electric motors (or generators), in which synchronism is produced by having both members of the machine electrically connected with the alternating-current circuit. Such machines therefore can be of the induction-type, differing from the ordinary asynchronous induction-motor (or generator) only therein, that both machine-members are in electrical connection with the alternating-current circuit. I have called these machines synchronous induction motors (or generators) and this term is used herein, to define these machines. Furthermore the class of machines referred to includes the different types of synchronous electric machines, in which the rotary part is in electrical connection with the circuit by means of a commutator or rectifying-device, such as all the different types of synchronous self-exciting generators or synchronous self-exciting motors.

When using machines of the induction type as synchronous motors, the starting up to a speed, which is equal or nearly equal to the synchronous speed can be effected by different means, as described and claimed in different applications for a patent, filed by me. My present invention is independent of the method, which is employed for starting such motors up to their synchronous speed, but contemplates a method, after the starting of the motor has been accomplished, to define the proper relative angular position between the two motor-members, which is fixed by the regular synchronous speed, at which the motor is intended to be operated.

The synchronous induction motor more particularly, when brought up to or nearly to the synchronous speed, which is obtained by electrically connecting both members of the motor with the alternating-current circuit, can then be connected in the proper way, so as to operate synchronously and will often immediately assume the exact synchronous speed, and therewith the proper relative angular position of the two motor-members, which is determined and maintained by the synchronism. For most purposes however it is necessary to exactly determine the moment of synchronism, before making the connections to regularly operate the motor or generator at the intended synchronous speed. Although, when properly connected up, the motor or generator will generally have a tendency to assume its synchronous speed and therewith the proper angular position, when running at a speed, which is nearly equal to the synchronous speed, it may happen, that in the moment of making the connections for the synchronous speed the motor or generator is in an unfavorable angular position, which will cause a momentary rush of the current taken from the alternating-current circuit or even an absolute short-circuit in case the windings of stator and rotor are in a relative position to destroy their fields.

With regard to the angular position of rotor and stator in the moment of impressing the voltage of the supply-circuit upon the windings of both motor-members, three different cases are possible, viz: First case. The poles produced in one member are exactly facing opposite poles of the other member; the motor will then represent a maximum of self-induction. Second case. The poles produced in one member are exactly facing equal poles of the other member; the motor will then represent a minimum of self-induction. Third case. The poles produced in the two motor-members are in a position intermediate between the positions of the first and the second case; the motor will then represent a self-induction, of a magnitude lying between the maximum of the first case and the minimum of the second case.

The first case gives the most favorable condition for a synchronous operation of the motor, the connections for a synchronous operation therefore should be made in the moment of the occurrence of the first case. The motor then will take up not more current, than when running under no load. Also in case the starting-device of the motor is capable to start the motor under a part of its load or under full load, the motor will not take more current from the alternating current circuit, than is corresponding to the load actually carried by the motor.

The second case will cause the two fields in stator and rotor to be in opposition, thus the motor will offer very little self-induction, and accordingly take up a considerable current, when connected so as to operate synchronously. The most unfavorable condition for synchronizing is therefore found in the moment of the occurrence of the second case.

The third case is often more or less equivalent to the first or to the second case, and the connections for a synchronous operation can be made without any obnoxious effect, when the third case is approaching the first case.

The object of my present invention is to determine, which of the three cases is present, when the synchronizing of the motor is intended, and more specially to determine the moment of the occurrence of the first case, in order to make the connections for the synchronous speed in the most favorable moment.

In carrying out my invention, I arrange the synchronous induction motor or generator and the necessary devices in accordance with the accompanying drawing, of which—

Figure 2:
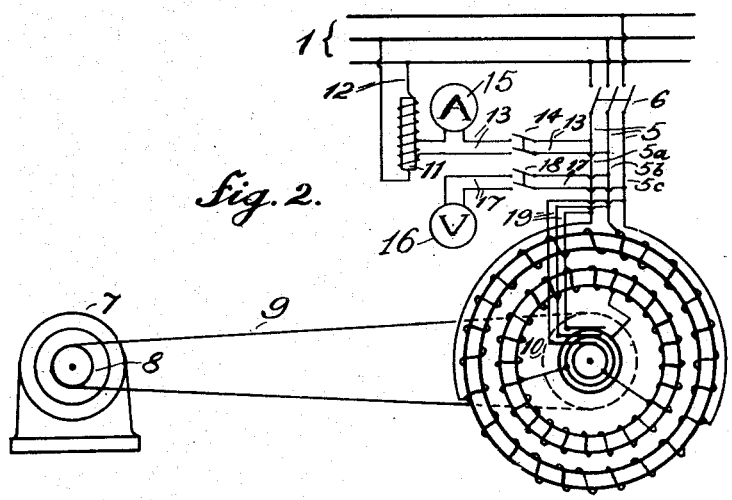

Figure 1 shows my invention applied to a synchronous induction motor, having stator and rotor-windings connected in series, while Fig. 2 shows the application of my invention to such a motor, having stator and rotor-windings connected in parallel.

Fig. 1 more particularly shows the mains 1 of an alternating-current circuit (three-phase), an alternating-current motor 2, having alternating current windings on both of its members. The windings of the rotor 3 of this motor are connected over collector-rings and brushes, as shown, in series with the windings of the stator 4, and the windings of the stator 4 are properly connected by means of the conductors 5 and the main-switch 6 with the mains of the alternating-current circuit. Thus when switch 6 is closed, and the motor is brought up to its synchronous speed, the motor will operate as synchronous induction motor. As the method of starting the synchronous induction motor is independent of my present invention, I have shown the synchronous induction motor as being started by a special small motor 7 by means of the pulley 8, belt 9 and pulley 10. The motor 7 may be a motor of any kind and has the only purpose to start the synchronous induction motor up to a speed, which is about equal, or also somewhat higher or lower than the synchronous speed of the motor 2. The operation of determining the occurrence of the first case and the most favorable moment for closing the main switch and running the motor with its regular synchronous speed from the alternating-current circuit is carried out as follows: I impress a part of the supply-voltage upon one phase (the corresponding phase) of the motor, said part for instance being obtained by tapping an inductive resistance 11, which is connected by means of the conductors 12 with one of the phases of the alternating-current mains 1, and furthermore tapped by the conductors 13, which are connected over the switch 14, when closed, with the conductors 5ª and 5ᵇ, which supply the corresponding phases of the windings of both members of the motor, when operating as synchronous induction motor. Inserted in the conductors 13 is an ampere-meter 15, which indicates the current taken up by the motor, when running nearly at synchronous speed and when offering different amounts of self-induction in different momentary angular positions. Therefore every change in the relative angular position of the motor-members will manifest itself in the ampere-meter 15 as a corresponding change of the current taken up by the motor. More particularly the proper momentary angular position, which is most favorable for a synchronous operation of the motor (first case, maximum self-induction) will manifest itself by a minimum value shown by the ampere-meter, while the most unfavorable position (second case, minimum self-induction) will be indicated by a maximum value shown by the ampere-meter. Also an intermediate momentary angular position (third case) will be indicated by an intermediate position of the ampere-meter, viz., the ampere-meter will show a value between said minimum and maximum values, which are indicated during the occurrence of the first and second case respectively.

The different amounts of self-induction represented by the motor in its different momentary angular positions, can equally well be indicated by a voltmeter 16, which is connected over the conductors 17 and switch 18 with another phase of the motor-windings for instance with the phase between the conductors 5ᵇ and 5ᶜ. The windings of the motor, to which the voltmeter is connected, are with regard to the windings, to which the voltage is impressed, in a relation similar to the secondary and primary windings of a transformer, therefore the electromotive forces induced in the windings between the conductors 5ᵇ and 5ᶜ will be in proportion to the magnetic field-strength of the field produced in the motor, but not to the amount of current taken from the circuit and shown in the ampere-meter. It is therefore obvious, that the voltmeter can equally well as the ampere-meter be used to indicate the most favorable momentary position of the motor-members by a maximum voltage set up in the windings between the conductors 5ᵇ and 5ᶜ. Either one of the two instruments, the ampere-meter 15 as well as the voltmeter 16 can be used to determine the proper moment, in which the motor can be synchronously operated by the alternating-current circuit. In practice therefore only one of the instruments is necessary to obtain a synchronizing of the motor, it may however be of advantage, to use both instruments as shown in the drawing.

The operation of the motor in brief is as follows: The motor is brought up to a speed, which is in the neighborhood of the synchronous speed, which is intended to be produced by simultaneously connecting both motor-members with the alternating-current circuit. Then a small part of the supply-voltage is impressed upon the motor-windings by closing the switch 14. The speed at which the motor is running may be practically equal to the synchronous speed, but will always be such as to slightly differ therefrom, and to produce successively the first, second and third case. Switch 18 may be closed simultaneously with switch 14 in order to operate the voltmeter 16. The instruments 15 and 16 will then indicate in synchronism with the occurrence of the first, second and third case in the motor a minimum, maximum or intermediate value of current and a maximum, minimum or intermediate value of voltage respectively. The proper moment for synchronously operating the motor is therefore indicated by either one of the instruments 15 or 16, by the ampere-meter 15, when showing a minimum current and by the voltmeter 16, when showing a maximum voltage. The regular synchronous working of the motor can then be effected by closing the main-switch 6. Before or simultaneously with the closing of the switch 6 the switches 14 and 18 should be opened, in order to prevent the instruments from being operated by the regular supply-voltage of the mains 1.

In practice the arrangement of the devices as shown in the drawing may be more or less changed, without departing from the spirit of my invention. For instance the instruments 15 and 16 need not be regular ampere and voltmeters, which are capable of showing the current and the voltage in amperes and volts respectively, as for the purpose of my invention it is only of interest to indicate the moment of minimum current and maximum voltage. Also these instruments for instance may be replaced by incandescent lamps, which show the proper conditions by their greater or less brilliancy. Furthermore when using instruments the moment which is best adapted to produce the synchronous speed, can be determined by a practical trial, and the proper position of the instruments can then be fixed by a mark, which is put on the scale of the instruments.

Also for certain cases it may be more advantageous, to produce the synchronous operation of the motor not exactly in the moment which is indicated by the instruments or their equivalent devices by a maximum or minimum value, but somewhat earlier or later, which also may be best determined by a practical test.

In Fig. 2 I have shown the same arrangement for a synchronous induction motor, the rotor and stator circuits of which are in parallel. The arrangement of the devices and the mode of operation is exactly the same as shown and described for Fig. 1. Also in Fig. 2 the same letters as in Fig. 1 are used for the same devices. In Fig. 2 more specially the rotor-windings are paralleled with the stator windings by means of the conductors 19, which join the conductors 5 as shown in the drawing. The phases of the stator as well as the phases of the rotor-windings are connected in delta and the connection of the rotor-winding with the conductors 19 especially are made by means of collector-rings and brushes as shown.

While in the foregoing description and accompanying drawing the synchronous machine is intended to be operated as synchronous motor, I wish to be understood, that it may equally well be employed as a generator. In this case naturally there is no difference in the arrangement of the devices; the motor 7 only would then indicate the prime-mover, by which the generator 2 is driven.

While I have shown herein and particularly described some embodiments of my invention, I do not wish to limit myself to the precise arrangements as herein shown, since many modifications can be made without departing from the spirit of my invention.

Having thus described my invention, I claim as new and desire to secure by Letters Patent—

1. The new art of synchronizing, which consists in impressing a part of the voltage of a current source on a dynamo when near synchronism, and applying the full voltage of said source at an instant of a critical inductive reaction of said dynamo.

2. The new art of synchronizing a dynamo with a current source, which consists in preliminarily connecting both members of said dynamo with a part of the voltage of the source, and supplying normal operating current to said dynamo at an instant which is characterized by a critical inductive behavior of said dynamo when preliminarily connected.

3. The method of synchronizing a dynamo with a current source, which consists in exciting both members of said dynamo similarly to normal synchronous operation from a part of the voltage of the source for producing a relatively weak field in either member, and normally connecting said dynamo to the source for synchronous operation in a moment where said fields are adding each other.

4. The method of synchronizing a synchronous dynamo with respect to a given current source, which consists in rotating said dynamo near synchronism, supplying both members of said dynamo when so rotating with current of a value considerably less than that of the normal operating current for the purpose of determining an instant which is favorable for proper synchronous operation, and supplying the normal operating current to said dynamo at or approximately at said instant.

5. The method of synchronizing a dynamo with a given alternating-current source, which consists in impressing a comparatively small part of the voltage upon said dynamo when rotating in proximity to synchronism, and establishing the normal connections for synchronous operation at an instant which is characterized by a critical value of self-induction of said dynamo.

6. The method of synchronizing a dynamo with an alternating-current source, which consists in first establishing connections between said dynamo and a comparatively small part of the voltage of said source, said connections being similar to those for normal synchronous operation, and connecting said dynamo normally to said source at the instant when the self-induction of said dynamo reaches a certain critical value.

7. The method of synchronizing a dynamo with an alternating-current source, which consists in establishing preliminary connections between said dynamo and a part of the voltage of said source, and normally connecting said dynamo, when in proximity to synchronism, to said source at the instant, when a maximum value of field strength is developed in said dynamo by said preliminary connections.

8. The method of synchronizing a dynamo with an alternating-current source, which consists in establishing preliminary connections between said dynamo and a comparatively small part of the voltage of said source, indicating the variable field strength thus developed in said dynamo when in proximity to synchronism, and normally connecting said source to said dynamo at the instant when a critical value of said field strength is developed in said dynamo.

9. The method of synchronizing a synchronous electric machine with respect to an alternating-current circuit, which consists in bringing said machine to a speed which is in proximity to synchronism, impressing a small part of the voltage of said alternating-current circuit upon said machine, indicating the varying value of the self-induction of said machine, and connecting said machine to said alternating-current circuit at the instant when its self-induction reaches a certain critical value.

10. The method of synchronizing a synchronous electric machine of the induction type with an alternating-current circuit, which consists in bringing said machine to a speed which is in proximity to synchronism, impressing a part of the voltage of said alternating-current circuit upon both members of said machine, indicating the varying amount of the self-induction of said machine, and connecting said machine for normal synchronous operation in or approximately in the moment when the windings of said machine have a certain critical value of self-induction.

11. The method of synchronizing a synchronous electric machine of the induction type with an alternating-current circuit, which consists in impressing a small part of the voltage of said alternating-current circuit upon both members of said machine, indicating the varying amount of self-induction of said machine when running in proximity to synchronism, and connecting said machine to said alternating-current circuit for normal synchronous operation at or approximately at the instant when said machine has a maximum value of self-induction.

In testimony whereof I have affixed my signature in presence of two witnesses.

CARL A. LOHR.

Witnesses:
G. S. MALTHA,
RAY MORRIS.

Copies of this patent may be obtained for five cents each, by addressing the "Commissioner of Patents, Washington, D. C."